(12) United States Patent
Tzeng

(10) Patent No.: US 11,336,218 B1
(45) Date of Patent: May 17, 2022

(54) MOTOR CONTROLLER

(71) Applicant: Global Mixed-mode Technology Inc., Hsin-Chu (TW)

(72) Inventor: Guang-Nan Tzeng, Hsinchu (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 0 days.

(21) Appl. No.: 17/121,768

(22) Filed: Dec. 15, 2020

(51) Int. Cl.
| | |
|---|---|
| *H02P 1/46* | (2006.01) |
| *H02P 27/14* | (2006.01) |
| *H02P 6/182* | (2016.01) |
| *H02P 21/22* | (2016.01) |

(52) U.S. Cl.
CPC ............ *H02P 27/14* (2013.01); *H02P 6/182* (2013.01); *H02P 21/22* (2016.02)

(58) Field of Classification Search
CPC .......... H02P 27/14; H02P 21/22; H02P 6/182; H02P 6/10; H02P 7/29; H02P 6/20
See application file for complete search history.

(56) References Cited

U.S. PATENT DOCUMENTS

| | | | |
|---|---|---|---|
| 7,477,034 B2 | 1/2009 | MacKay | |
| 2015/0069940 A1* | 3/2015 | Lee | H02P 6/182 318/400.06 |
| 2017/0366114 A1 | 12/2017 | Lu | |
| 2018/0269773 A1 | 9/2018 | Kaeriyama | |

FOREIGN PATENT DOCUMENTS

| | | |
|---|---|---|
| CN | 107425764 A | 12/2017 |
| TW | 200824227 | 6/2008 |
| TW | I699959 B | 7/2020 |

\* cited by examiner

*Primary Examiner* — Karen Masih
(74) *Attorney, Agent, or Firm* — Winston Hsu

(57) ABSTRACT

A motor controller comprises a switch circuit, a driving circuit, and a pulse width modulation circuit. The switch circuit is coupled to a three-phase motor for driving the three-phase motor. The driving circuit generates a plurality of control signals to control the switch circuit. When the three-phase motor is operated in a start state, the motor controller may enable an electric period to be divided into more floating phase time intervals for switching phases, so as to increase the success rate of phase switching. When the three-phase motor is operated in a stable state, the motor controller may enable the electric period to be divided into less floating phase time intervals for switching phases, so as to reduce the noise and vibration of the three-phase motor.

9 Claims, 5 Drawing Sheets

MOTOR CONTROLLER

BACKGROUND OF THE INVENTION

1. Field of the Invention

The present invention relates to a motor controller, and more particularly, to a motor controller which may be applied to a three-phase sensorless motor.

2. Description of the Prior Art

Conventionally, there are two driving methods for driving a three-phase motor. The first driving method uses the Hall sensor for switching phases, so as to drive the three-phase motor. The second driving method does not use the Hall sensor to drive the three-phase motor. The Hall sensor is affected by the external environment easily, such that the detecting accuracy is decreased. Besides, the installation of the Hall sensor results in an increase of the volume and the cost of the system. Therefore, the sensorless driving method is provided for solving the above problems.

In the sensorless driving method, the motor controller detects the back electromotive force of the floating phase for switching phases, so as to drive the three-phase motor. However, when the motor controller detects the back electromotive force during the floating phase time interval, the discontinuous phase current is generated and results in the noise and vibration of the three-phase motor. Thus, it is a goal to reduce the noise and vibration of the three-phase motor.

SUMMARY OF THE INVENTION

According to the present invention, a motor controller which is capable of reducing the noise and vibration of a three-phase motor is provided. The motor controller is used for driving a three-phase motor, where the three-phase motor has a first coil, a second coil, and a third coil. The motor controller comprises a switch circuit, a driving circuit, and a pulse width modulation circuit. The switch circuit includes a first transistor, a second transistor, a third transistor, a fourth transistor, a fifth transistor, a sixth transistor, a first terminal, a second terminal, and a third terminal, where the switch circuit is coupled to the three-phase motor for driving the three-phase motor. One terminal of the first coil is coupled to the first terminal. One terminal of the second coil is coupled to the second terminal. One terminal of the third coil is coupled to the third terminal. Furthermore, another terminal of the first coil is coupled to another terminal of the second coil and another terminal of the third coil. That is to say, the first coil, the second coil, and the third coil form a Y-shaped configuration. The driving circuit generates a first control signal, a second control signal, a third control signal, a fourth control signal, a fifth control signal, and a sixth control signal for respectively controlling the ON/OFF states of the first transistor, the second transistor, the third transistor, the fourth transistor, the fifth transistor, and the sixth transistor. The pulse width modulation circuit generates a pulse width modulation signal to the driving circuit, where the pulse width modulation signal has a duty cycle. The motor controller may control the speed of the three-phase motor by adjusting the duty cycle.

When the three-phase motor is operated in a start state, the motor controller may enable an electric period to be divided into more floating phase time intervals for switching phases, so as to increase the success rate of phase switching. When the three-phase motor is operated in a stable state, the motor controller may enable the electric period to be divided into less floating phase time intervals for switching phases, so as to reducing the noise and vibration of the three-phase motor. That is to say, the motor controller firstly enables the electric period to be divided into N1 floating phase time intervals for switching phases. When the three-phase motor is operated after a first time, the motor controller enables the electric period to be divided into N2 floating phase time interval(s) for switching phases, where each of N1 and N2 is a positive integer and N1 is greater than N2. When the electric period is divided into N1 floating phase time intervals, the three-phase motor is operated in a start state. When the electric period is divided into N2 floating phase time interval(s), the three-phase motor is operated in a stable state.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
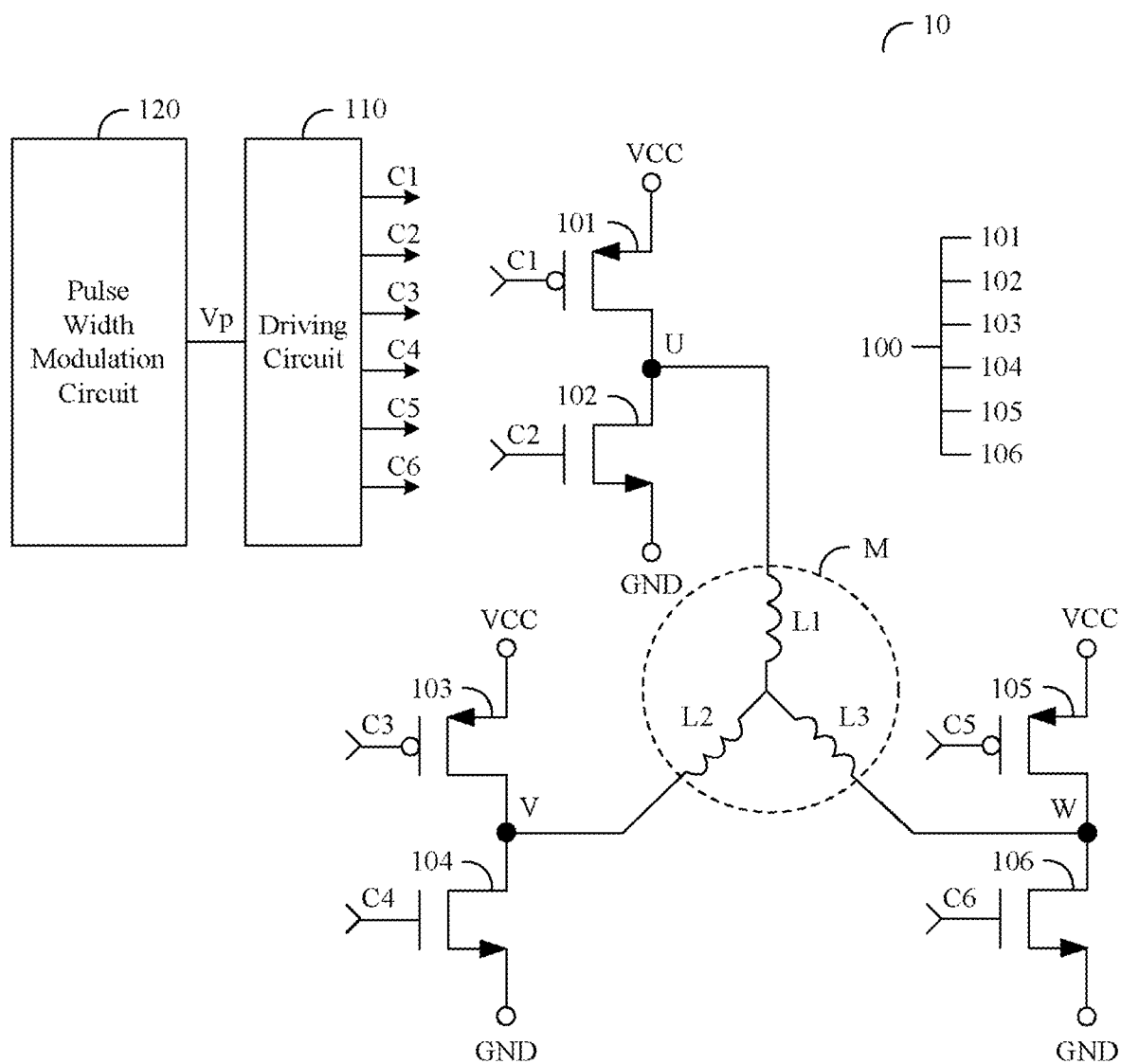
FIG. 1 is a schematic diagram showing a motor controller according to one embodiment of the present invention.

FIG. 1 is a schematic diagram showing a motor controller 10 according to one embodiment of the present invention. The motor controller 10 is used for driving a three-phase motor M, where the three-phase motor M has a first coil L1, a second coil L2, and a third coil L3. The motor controller 10 comprises a switch circuit 100, a driving circuit 110, and a pulse width modulation circuit 120. The switch circuit 100 includes a first transistor 101, a second transistor 102, a third transistor 103, a fourth transistor 104, a fifth transistor 105, a sixth transistor 106, a first terminal U, a second terminal V, and a third terminal W, where the switch circuit 100 is coupled to the three-phase motor M for driving the three-phase motor M. The first terminal U has a first voltage signal UO. The second terminal V has a second voltage signal VO. The third terminal W has a third voltage signal WO. The first transistor 101 is coupled to a terminal VCC and the first terminal U while the second transistor 102 is coupled to the first terminal U and a terminal GND. The third transistor 103 is coupled to the terminal VCC and the second terminal V while the fourth transistor 104 is coupled to the second terminal V and the terminal GND. The fifth transistor 105 is coupled to the terminal VCC and the third terminal W while the sixth transistor 106 is coupled to the third terminal W and the terminal GND. Each of the first transistor 101, the third transistor 103, and the fifth transistor 105 may be a p-type MOSFET. Each of the second transistor 102, the fourth transistor 104, and the sixth transistor 106 may be an n-type MOSFET.

One terminal of the first coil L1 is coupled to the first terminal U. One terminal of the second coil L2 is coupled to the second terminal V. One terminal of the third coil L3 is coupled to the third terminal W. Furthermore, another terminal of the first coil L1 is coupled to another terminal of the second coil L2 and another terminal of the third coil L3. That is to say, the first coil L1, the second coil L2, and the third coil L3 form a Y-shaped configuration. The driving circuit 110 generates a first control signal C1, a second control signal C2, a third control signal C3, a fourth control signal C4, a fifth control signal C5, and a sixth control signal C6 for respectively controlling the ON/OFF states of the first transistor 101, the second transistor 102, the third transistor 103, the fourth transistor 104, the fifth transistor 105, and the sixth transistor 106. The pulse width modulation circuit 120 generates a pulse width modulation signal Vp to the driving circuit 110, where the pulse width modulation signal Vp has a duty cycle. The motor controller 10 may control the speed of the three-phase motor M by adjusting the duty cycle.

Figure 2:
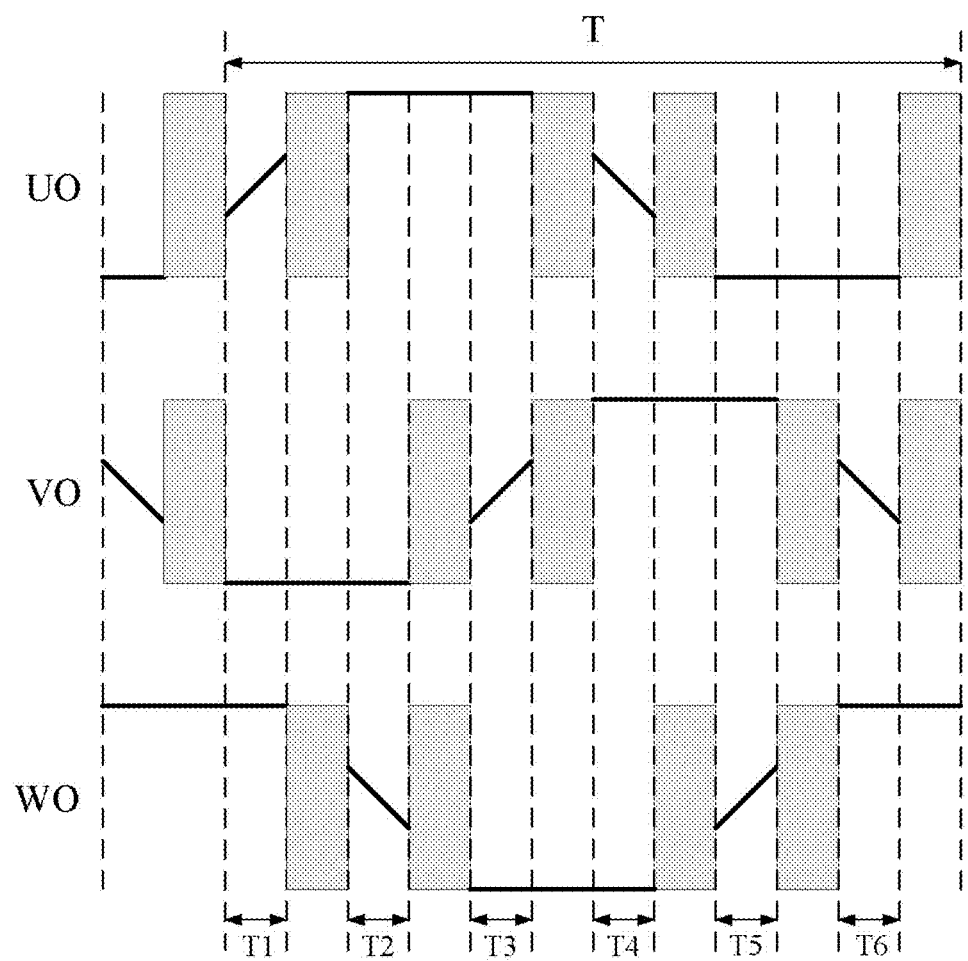
FIG. 2 is a first timing chart according to one embodiment of the present invention.
Figure 3:
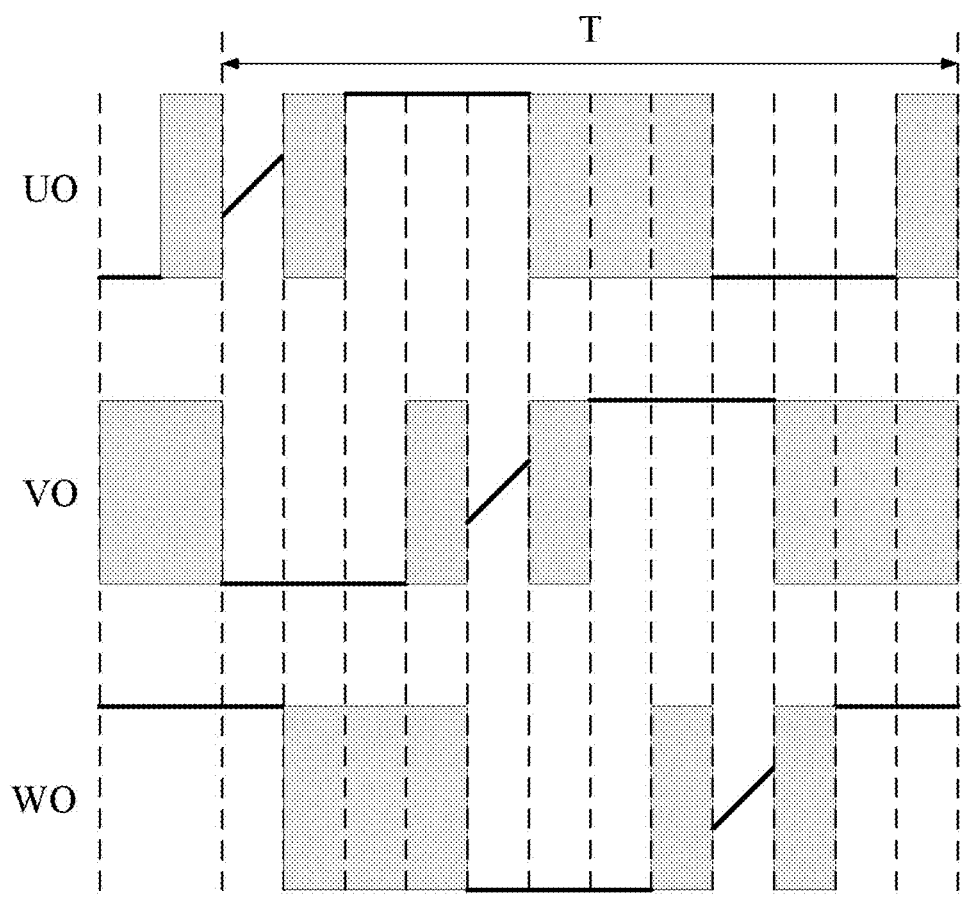
FIG. 3 is a second timing chart according to one embodiment of the present invention.
Figure 4:
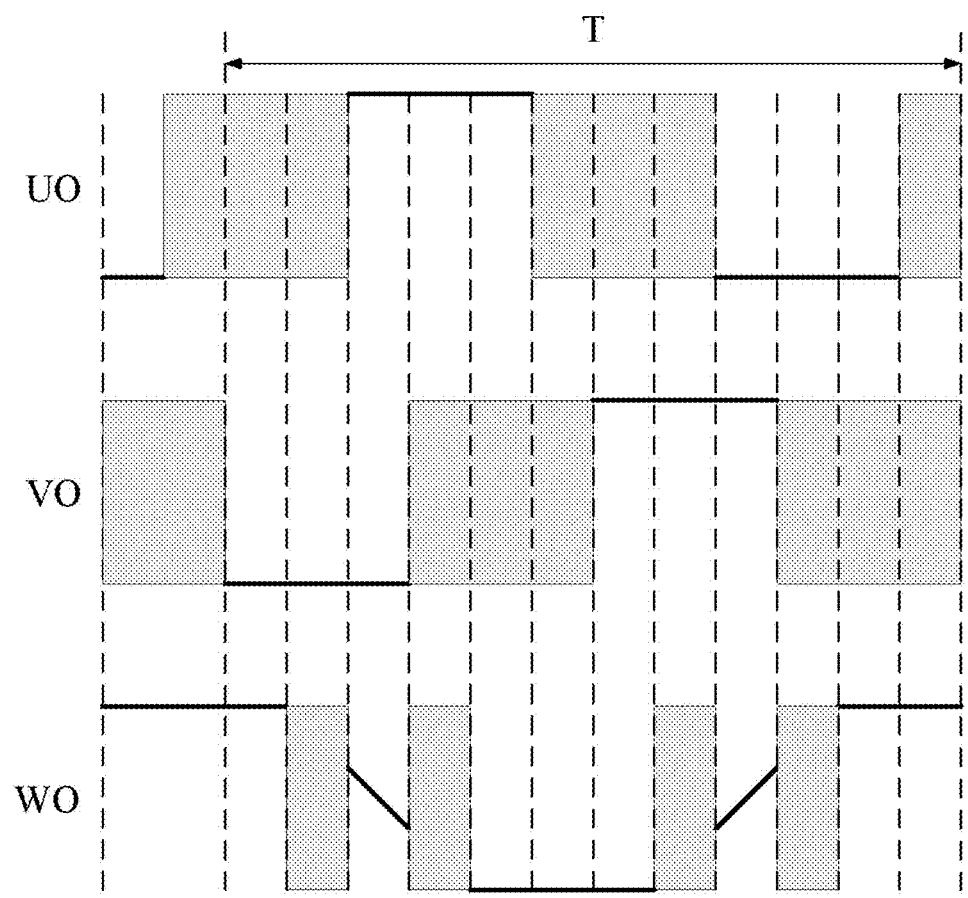
FIG. 4 is a third timing chart according to one embodiment of the present invention.
Figure 5:
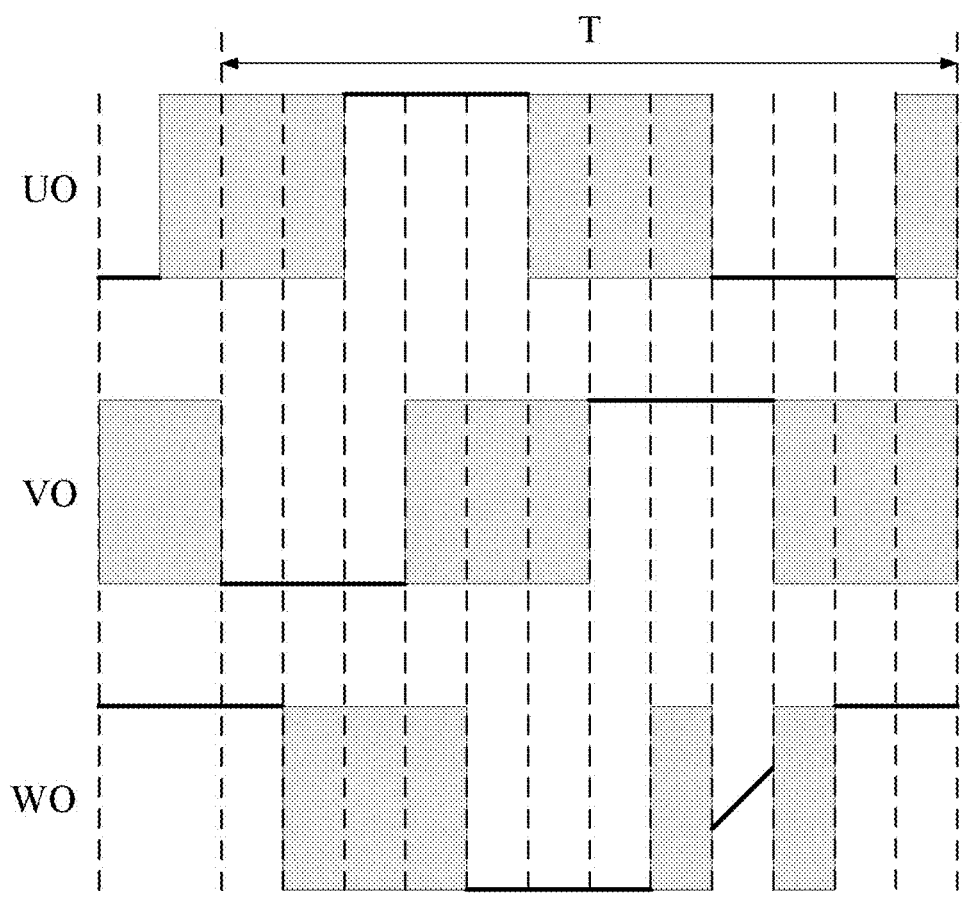
FIG. 5 is a fourth timing chart according to one embodiment of the present invention.

FIG. 2 is a first timing chart according to one embodiment of the present invention. The motor controller 10 enables the electric period T to be divided into six floating phase time intervals for detecting the back electromotive force, so as to switch phases. When the motor controller 10 is operated in a start state, since the rotation of the three-phase motor M is unstable, six floating phase time intervals may be used for detecting the back electromotive force. For example, the motor controller 10 may sequentially detect the phase switching time points for driving the three-phase motor M during the first floating phase time interval T1, the second floating phase time interval T2, the third floating phase time interval T3, the fourth floating phase time interval T4, the fifth floating phase time interval T5, and the sixth floating phase time interval T6. The motor controller 10 activates the third coil L3 and the second coil L2 sequentially during the first floating phase time interval T1, such that the floating phase is formed in the first coil L1. At this moment the motor controller 10 may detect the first voltage signal UO for detecting the phase switching time point. The motor controller 10 activates the first coil L1 and the second coil L2 sequentially during the second floating phase time interval T2, such that the floating phase is formed in the third coil L3. At this moment the motor controller 10 may detect the third voltage signal WO for detecting the phase switching time point. The motor controller 10 activates the first coil L1 and the third coil L3 sequentially during the third floating phase time interval T3, such that the floating phase is formed in the second coil L2. At this moment the motor controller 10 may detect the second voltage signal VO for detecting the phase switching time point. The motor controller 10 activates the second coil L2 and the third coil L3 sequentially during the fourth floating phase time interval T4, such that the floating phase is formed in the first coil L1. At this moment the motor controller 10 may detect the first voltage signal UO for detecting the phase switching time point. The motor controller 10 activates the second coil L2 and the first coil L1 sequentially during the fifth floating phase time interval T5, such that the floating phase is formed in the third coil L3. At this moment the motor controller 10 may detect the third voltage signal WO for detecting the phase switching time point. The motor controller 10 activates the third coil L3 and the first coil L1 sequentially during the sixth floating phase time interval T6, such that the floating phase is formed in the second coil L2. At this moment the motor controller 10 may detect the second voltage signal VO for detecting the phase switching time point. Furthermore, the motor controller 10 may gradually change the duty cycle of the pulse width modulation signal Vp for modulating a phase current at a boundary of a floating phase time interval, such that the phase current may change smoothly for reducing the noise and vibration of the three-phase motor M. FIG. 3 is a second timing chart according to one embodiment of the present invention. The motor controller 10 enables the electric period T to be divided into three floating phase time intervals for detecting the back electromotive force, so as to switch phases. FIG. 4 is a third timing chart according to one embodiment of the present invention. The motor controller 10 enables the electric period T to be divided into two floating phase time intervals for detecting the back electromotive force, so as to switch phases. FIG. 5 is a fourth timing chart according to one embodiment of the present invention. The motor controller 10 enables the electric period T to be divided into one floating phase time interval for detecting the back electromotive force, so as to switch phases.

More specifically, when the three-phase motor M is operated in a start state, the motor controller 10 may enable the electric period T to be divided into more floating phase time intervals for switching phases, so as to increase the success rate of phase switching. When the three-phase motor M is operated in a stable state, the motor controller 10 may enable the electric period T to be divided into less floating phase time intervals for switching phases, so as to reducing the noise and vibration of the three-phase motor M. That is to say, the motor controller 10 firstly enables an electric period to be divided into N1 floating phase time intervals for switching phases. When the three-phase motor M is operated after a first time, the motor controller 10 enables the electric period to be divided into N2 floating phase time interval(s) for switching phases, where each of N1 and N2 is a positive integer and N1 is greater than N2. When the electric period is divided into N1 floating phase time intervals, the three-phase motor M is operated in a start state. When the electric period is divided into N2 floating phase time interval(s), the three-phase motor M is operated in a stable state. Based on the above rule, there are at least seven embodiments as follows:

1. The motor controller 10 firstly enables the electric period to be divided into six floating phase time intervals for switching phases. When the three-phase motor M is operated after a first time, the motor controller 10 enables the electric period to be divided into one floating phase time interval for switching phases.

2. The motor controller 10 firstly enables the electric period to be divided into six floating phase time intervals for switching phases. When the three-phase motor M is operated after a first time, the motor controller 10 enables the electric period to be divided into two floating phase time intervals for switching phases.

3. The motor controller 10 firstly enables the electric period to be divided into six floating phase time intervals for switching phases. When the three-phase motor M is operated after a first time, the motor controller 10 enables the electric period to be divided into two floating phase time intervals for switching phases. When the three-phase motor M is operated after a second time, the motor controller 10 enables the electric period to be divided into one floating phase time interval for switching phases, where the second time is greater than the first time.

4. The motor controller 10 firstly enables the electric period to be divided into six floating phase time intervals for switching phases. When the three-phase motor M is operated after a first time, the motor controller 10 enables the electric period to be divided into three floating phase time interval for switching phases.

5. The motor controller 10 firstly enables the electric period to be divided into six floating phase time intervals for switching phases. When the three-phase motor M is operated after a first time, the motor controller 10 enables the electric period to be divided into three floating phase time intervals for switching phases. When the three-phase motor M is operated after a second time, the motor controller 10 enables the electric period to be divided into one floating phase time interval for switching phases, where the second time is greater than the first time.

6. The motor controller 10 firstly enables the electric period to be divided into three floating phase time intervals for switching phases. When the three-phase motor M is operated after a first time, the motor controller 10 enables the electric period to be divided into one floating phase time interval for switching phases.

7. The motor controller 10 firstly enables the electric period to be divided into two floating phase time intervals for switching phases. When the three-phase motor M is operated after a first time, the motor controller 10 enables the electric period to be divided into one floating phase time interval for switching phases.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal;
   a driving circuit, configured to generate a plurality of control signals to control the switch circuit; and
   a pulse width modulation circuit, configured to generate a pulse width modulation signal to the driving circuit, wherein the pulse width modulation signal has a duty cycle, the motor controller firstly enables an electric period to be divided into N1 floating phase time intervals for switching phases, when the three-phase motor is operated after a first time, the motor controller enables the electric period to be divided into N2 floating phase time interval(s) for switching phases, each of N1 and N2 is a positive integer, N1 is greater than N2, and the motor controller gradually changes the duty cycle for modulating a phase current at a boundary of a floating phase time interval.

2. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal;
   a driving circuit, configured to generate a plurality of control signals to control the switch circuit; and
   a pulse width modulation circuit, configured to generate a pulse width modulation signal to the driving circuit, wherein the motor controller firstly enables an electric period to be divided into N1 floating phase time intervals for switching phases, when the three-phase motor is operated after a first time, the motor controller enables the electric period to be divided into N2 floating phase time interval(s) for switching phases, each of N1 and N2 is a positive integer, N1 is greater than N2, when the electric period is divided into N1 floating phase time intervals, the three-phase motor is operated in a start state, and when the electric period is divided into N2 floating phase time interval(s), the three-phase motor is operated in a stable state.

3. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal;
   a driving circuit, configured to generate a plurality of control signals to control the switch circuit; and
   a pulse width modulation circuit, configured to generate a pulse width modulation signal to the driving circuit, wherein the motor controller firstly enables an electric period to be divided into six floating phase time intervals for switching phases, and when the three-phase motor is operated after a first time, the motor controller enables the electric period to be divided into one floating phase time interval for switching phases.

4. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal;
   a driving circuit, configured to generate a plurality of control signals to control the switch circuit; and
   a pulse width modulation circuit, configured to generate a pulse width modulation signal to the driving circuit, wherein the motor controller firstly enables an electric period to be divided into six floating phase time intervals for switching phases, and when the three-phase motor is operated after a first time, the motor controller enables the electric period to be divided into two floating phase times interval for switching phases.

5. A motor controller configured to drive a three-phase motor, wherein the three-phase motor has a first coil, a second coil, and a third coil, and the motor controller comprising:
   a switch circuit, coupled to the three-phase motor, wherein the switch circuit comprises a first terminal, a second terminal, and a third terminal;
   a driving circuit, configured to generate a plurality of control signals to control the switch circuit; and
   a pulse width modulation circuit, configured to generate a pulse width modulation signal to the driving circuit, wherein the motor controller firstly enables an electric period to be divided into six floating phase time intervals for switching phases, when the three-phase motor is operated after a first time, the motor controller enables the electric period to be divided into two floating phase time intervals for switching phases, when the three-phase motor is operated after a second time, the motor controller enables the electric period to be divided into one floating phase time interval for switching phases, and the second time is greater than the first time.

6. A motor controller configured to drive a three-phase motor, wherein the three-phase motor has a first coil, a second coil, and a third coil, and the motor controller comprising:
 a switch circuit, coupled to the three-phase motor, wherein the switch circuit comprises a first terminal, a second terminal, and a third terminal;
 a driving circuit, configured to generate a plurality of control signals to control the switch circuit; and
 a pulse width modulation circuit, configured to generate a pulse width modulation signal to the driving circuit, wherein the motor controller firstly enables an electric period to be divided into six floating phase time intervals for switching phases, and when the three-phase motor is operated after a first time, the motor controller enables the electric period to be divided into three floating phase time intervals for switching phases.

7. A motor controller configured to drive a three-phase motor, wherein the three-phase motor has a first coil, a second coil, and a third coil, and the motor controller comprising:
 a switch circuit, coupled to the three-phase motor, wherein the switch circuit comprises a first terminal, a second terminal, and a third terminal;
 a driving circuit, configured to generate a plurality of control signals to control the switch circuit; and
 a pulse width modulation circuit, configured to generate a pulse width modulation signal to the driving circuit, wherein the motor controller firstly enables an electric period to be divided into six floating phase time intervals for switching phases, when the three-phase motor is operated after a first time, the motor controller enables the electric period to be divided into three floating phase time intervals for switching phases, when the three-phase motor is operated after a second time, the motor controller enables the electric period to be divided into one floating phase time interval for switching phases, and the second time is greater than the first time.

8. A motor controller configured to drive a three-phase motor, wherein the three-phase motor has a first coil, a second coil, and a third coil, and the motor controller comprising:
 a switch circuit, coupled to the three-phase motor, wherein the switch circuit comprises a first terminal, a second terminal, and a third terminal;
 a driving circuit, configured to generate a plurality of control signals to control the switch circuit; and
 a pulse width modulation circuit, configured to generate a pulse width modulation signal to the driving circuit, wherein the motor controller firstly enables an electric period to be divided into three floating phase time intervals for switching phases, and when the three-phase motor is operated after a first time, the motor controller enables the electric period to be divided into one floating phase time interval for switching phases.

9. A motor controller configured to drive a three-phase motor, wherein the three-phase motor has a first coil, a second coil, and a third coil, and the motor controller comprising:
 a switch circuit, coupled to the three-phase motor, wherein the switch circuit comprises a first terminal, a second terminal, and a third terminal;
 a driving circuit, configured to generate a plurality of control signals to control the switch circuit; and
 a pulse width modulation circuit, configured to generate a pulse width modulation signal to the driving circuit, wherein the motor controller firstly enables an electric period to be divided into two floating phase time intervals for switching phases, and when the three-phase motor is operated after a first time, the motor controller enables the electric period to be divided into one floating phase time interval for switching phases.

\* \* \* \* \*